July 4, 1950        H. P. BRADLEY        2,514,196
RESORCINOL FORMALDEHYDE ADHESIVE
Filed Dec. 12, 1946
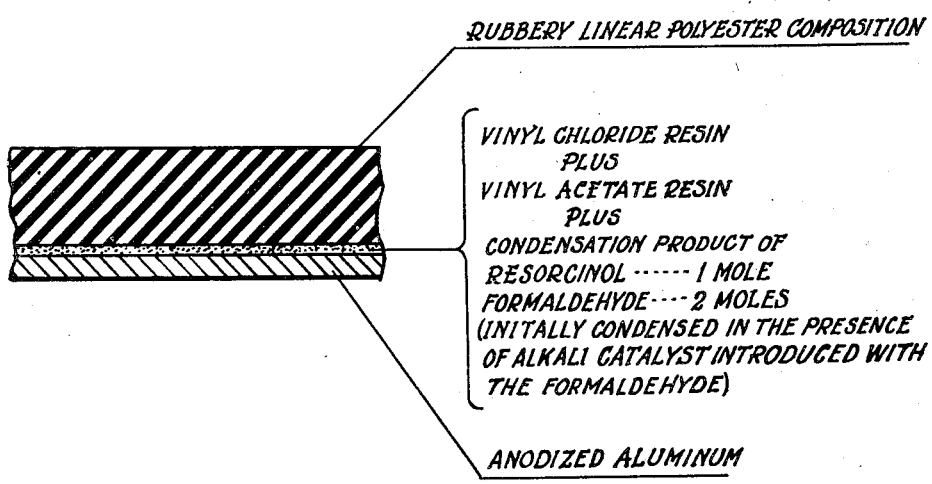
Inventor
Harry P. Bradley
By Ely & Frye
Attorneys Patented July 4, 1950

2,514,196

UNITED STATES PATENT OFFICE 2,514,196

RESORCINOL FORMALDEHYDE ADHESIVE

Harry P. Bradley, Cuyahoga Falls, Ohio, assignor to The Firestone Tire & Rubber Company, Akron, Ohio, a corporation of Ohio Application December 12, 1946, Serial No. 715,633

6 Claims. (Cl. 204—58)

This invention relates to adhesives, and more particularly, to adhesives for establishing bonds to metals and other metals.

The resorcinol-formaldehyde resins exhibit a strong affinity for metallic and other surfaces, and therefore come into consideration as adhesives and adhesive components. Unfortunately, as heretofore prepared, and particularly when they have reached an advanced stage of polymerization, these resins are insoluble or, when soluble, their solutions gel easily. Fairly stable solutions have, indeed, been made from formaldehyde-deficient resorcinol-formaldehyde condensates. However, such solutions require the addition of supplemental formaldehyde before use, which is highly unsatisfactory due to the inconvenience and odor involved.

A particularly difficult problem has been the adhesion of fuel-sealing membranes to the interior of integral fuel compartments in airframes. Such sealing membranes must be laid down by slushing after the fabrication of the airframe component is completed, and the importance of a reliable bonding procedure is manifest. Any bonding medium employed must withstand the solvent action of aromatic fuels and of water, and must retain its flexibility at extreme low temperatures. Prior to the instant invention, no satisfactory adhesive has been developed for this purpose.

Accordingly, it is an object of this invention to provide novel adhesives containing resorcinol-formaldehyde resins.

Another object is to provide such adhesives in the form of stable solvent cements which will remain fluid and workable over extended periods of time.

A further object is to provide such solutions which will not require the addition of supplemental quantities of formaldehyde for final use, i. e., to provide a "one solution" adhesive.

A further object is to provide such adhesives which will require the application of only a moderate degree of heat to effect conversion thereof to a final cured, insoluble state.

A further object is to provide such adhesives which will, in their final state of application, withstand the solvent effects of aircraft fuels and of water, and which will remain flexible at extreme low temperatures.

A still, further, and highly specific, object is to provide a satisfactory and reliable adhesive base or primer for securing fuel-sealing coatings to the interior surfaces of integral fuel compartments in airframes.

The above and other objects are secured, in accordance with this invention, in solvent cements containing:

(1) A partially condensed, soluble, resorcinol formaldehyde resin containing very small amounts of alkaline catalysts, prepared by special procedures hereinafter more particularly described.

(2) A ketone or like solvent in sufficient quantity to retard further condensation of the resorcinol-formaldehyde resin.

(3) (Optionally but preferably) a vinyl chloride based resin, to impart flexibility and solvent resistance to the adhesive, and (4) (Optionally but preferably) a vinyl acetate resin, to impart, in coaction with the other ingredients, moisture resistance to the adhesive.

The adhesive composition is coated upon the metallic or other surfaces to be adhered, and heated briefly at relatively low temperatures, whereupon the resorcinol-formaldehyde resin becomes converted to an insoluble form having tenacious adhesion to the surface to which it is applied. When used as an adhesive foundation or primer under a slushed-on coat of a fuel sealant such as the polyester elastomer compositions frequently used for this purpose, the compositions of this invention establish a firm, reliable, solvent-, water- and cold-resistant adhesive bond between the sealant and any underlying metal, such as the aluminum-bearing metals employed in aircraft. This is an object long desired in the lining of integral fuel compartments in airframes. The adhesives of this invention are likewise suitable for bonding a wide variety of other materials, as will appear more fully hereinafter.

Referring first to the specially prepared partially condensed resorcinol-formaldehyde resin, this must, as noted, contain only minimal quantities of alkaline catalysts. This is rather a difficult qualification, as the alkaline catalysts are somewhat insoluble in the solvent-resorcinol-formaldehyde reaction mixtures considered here (i. e., the solvents having been found most suitable for adhesives of the type under consideration have very limited solvent power for alkaline catalysts), and accordingly, resorcinol-formaldehyde resins have heretofore been prepared by reacting resorcinol and formaldehyde in dilute solution in appropriate solvents and in the presence of large quantities of alkaline catalysts. It would not be possible to arrest the further condensation of such resins beyond the soluble stage, due to the presence of the large excess of alkaline catalyst—i. e., the stable non-gelling cements contemplated by this invention could not be produced. Likewise, even if it were possible to prepare suitable cements from prior art resorcinol resins, the large amounts of alkaline catalysts associated therewith would impair the moisture resistance of the final bond. In the practice of the instant invention, however, the resorcinol and formaldehyde are reacted in the presence of minimal quantities of solvents, or no solvents at all, the small amounts of alkaline catalysts necessary under these conditions being supplied by dissolving the alkaline catalyst in the concentrated formaldehyde solution prior to its introduction into the reaction mass. It has been found that the catalyst so introduced, despite its insolubility when introduced in the customary modes into resorcinol-formaldehyde reaction masses, becomes dispersed and/or dissolved in the mass in such a form that only a relatively minor portion of alkaline catalyst is necessary to effect the condensation upon moderate heating. When the mass has become condensed to the desired extent, the reaction is substantially arrested by lowering the temperature and by diluting the mass with solvents. The resultant dilute solution, due to the relatively small amount of catalyst contained therein, will remain stable for extended periods of time.

Regarding the details of the process broadly outlined in the preceding paragraph, the resorcinol and formaldehyde should be condensed in a mol ratio of approximately 1 mol of resorcinol to 2 mols of formaldehyde. It is understood that the formaldehyde must be used in concentrated aqueous solution—preferably about 37% and not less than about 20%, to avoid the introduction of water which would render the condensation uncontrollable. The amount of alkaline catalyst employed should be from about 0.5% to about 2.0% of potassium hydroxide (or molecularly equivalent amounts of sodium or lithium hydroxide) based on the weight of resorcinol and formaldehyde to be condensed. Any solvent (exclusive of the water entrained with the formaldehyde) employed in the condensation procedure should preferably range between about 150% and about 250%, based on the weight of resorcinol and formaldehyde, and should preferably be a lower alkyl ketone in which the sum of the carbon atoms ranges from 4 to 12, such as methyl ethyl ketone, amyl ketone, and the like. Cyclohexanone may also be used. The condensation reaction should be carried out at temperatures ranging from about 50° C. to about 90° C. As noted, the condensation is halted by cooling and dilution at a point somewhat short of the formation of insoluble products, roughly about five minutes prior to the time at which the gel formation would occur. The time required to effect the requisite degree of condensation will vary considerably with conditions, higher temperatures and greater concentration of catalysts requiring less time. By way of establishing a bench mark from which those skilled in the art can estimate the proper times and conditions of condensation, a reaction of one mol of resorcinol and two mols of formaldehyde dissolved in an equal weight of methyl ethyl ketone and catalyzed by the presence of 1% of potassium hydroxide, based on the total weight of resorcinol and formaldehyde, will proceed to the desired extent in about 45 minutes at 70° C.

When the reaction has proceeded to the requisite extent, the mass is cooled and diluted with a suitable ketone or other solvent to yield a concentration of not greater than about 15%, and preferably not greater than about 5%, of resorcinol-formaldehyde condensate in the solution, the latter figure being preferable for application purposes, since the adhesives of this invention work best in thin films. Likewise, the more dilute solutions appear to operate more satisfactorily when low degrees of heat cure and of adhesion pressure are applied. The resultant solution or cement may be kept for an extended period of time without gelling. The above cooling and storage should be below 30° C.

While the partially condensed resorcinol-formaldehyde resin might be used directly as an adhesive, the resultant bond would be somewhat deficient in flexibility, particularly at low temperatures. Likewise, the bonding medium would be somewhat susceptible to attack by water. These defects are overcome in accordance with this invention, by the addition of from about 80% to about 100% of a vinyl chloride based resin, and from about 60% to about 100% of a vinyl acetate based resin, based on the weight of resorcinol-formaldehyde condensate. Suitable vinyl chloride based resins are polyvinyl chloride, and copolymers of vinyl chloride with minor proportions (say up to 15%) of other unsaturated compounds copolymerizable therewith such as vinyl acetate, vinyl bromide, vinyl fluoride, vinylidene chloride, styrene, vinyl ethers, acrylic-type esters and nitriles, and conjugated unsaturated compounds such as butadiene, chloroprene, isoprene and the like. Suitable vinyl acetate resins are the polyvinyl acetates, and copolymers of vinyl acetate with up to 15% of other unsaturated compounds such as those suggested for copolymerization with vinyl chloride, and also including vinyl chloride.

With respect to the vinyl chloride and vinyl acetate based resins, the essential feature of these resins is that they shall contain polymerized or copolymerized therein at least 85% of the vinyl chloride or vinyl acetate as the case may be. It is well known that a myriad of other unsaturated compounds may be copolymerized with vinyl chloride and vinyl acetate in minor proportions which, up to the extent of about 15%, do not affect the basic character of the resultant resins. About the only exception which may be noted is where the copolymerized compound is characterized by plural, non-conjugated unsaturation, in which case the inclusion of more than one or two percent will substantially reduce the solubility of the resin, assuming that such comonomer is fully copolymerized, i. e. two or more of its unsaturated groups have entered into the polymer structure. For a fairly exhaustive list of unsaturated compounds which have been copolymerized with vinyl chloride and acetate, reference is made to Krczil "Kurzes Handbuch Der Polymerisationstechnik— II Mehrstoff-polymerisation" Edwards Brothers Inc. 1945, pages 732–3, the items under "Vinylacetat" and pages 735–737, the items under "Vinylchlorid."

In use, the adhesives of this invention are applied as a film to any object (which will be termed a substrate), to which it is desired to adhere some other object or material (which will be termed a superstrate). In some cases, the superstrate are assembled together, while the adhesive film is still in tacky condition, and the assembly, after drying, is heated to moderate curing temperatures, say as low as about 70° C. whereby the adhesive is converted to an insoluble and tenacious bond between the substrate and superstrate. Preferred temperatures are in the neighborhood of 100° C., and it is understood that still higher temperatures, up to about 125° C. may be used in some cases. In other cases, the compositions of this invention are used as an adhesive primer, i. e., the substrate is coated with the adhesive solution, dried, and cured at the same curing temperatures set forth above. The resultant cured coating adheres tenaciously to the substrate, and provides a highly receptive foundation to which the superstrate may be adhered, either by virtue of the superstrate's own adhesive properties, or by the use of a further bonding medium, either an adhesive such as described in this specification or some other type of adhesive. It will be appreciated that the adhesive compositions of this invention, when used as primers in this way, have the advantage of being capable of establishing bonds with surfaces which are repellent to most adhesives, and of providing a foundation upon which other, more selective, adhesives and adhesive procedures may be employed.

The adhesives of this invention are capable of establishing bonds with a wide variety of materials. Of prime importance, they are capable of establishing firm, solvent- and water-resistant bonds to a number of metals, such as aircraft alloys on the order of pure aluminum, anodized aluminum, Duralumin, magnesium and its alloys, etc.; ferrous metals such as iron, steel, stainless steel, and the like; and zinc, copper, brass, bronze, zinc, Monel and the like. It will also be understood that the adhesives of this invention are capable of establishing bonds with non-metallic materials, such as ceramics, glass, wood, fiber, plastics, textile fabrics, elastomeric compositions (particularly fuel sealing compositions) and the like.

As noted above, a very important special application of this invention resides in the bonding of fuel sealing compositions to the interior surfaces of integral airframe fuel compartments. The practice has grown up, particularly in the adaptation of standard aircraft for long distance or fuel transportation service, of blocking off sections of the wings, etc., by means of bulkheads, and employing the enclosed hollow space as a fuel, etc. tank. The metallic skin is perforated by numerous rivet holes, seams, etc., and a sealant composition (usually a rubbery linear polyester composition) must be slushed onto the interior surfaces to seal these apertures. The aluminum, etc., materials are in rather indifferent state of cleanliness and moreover have little affinity for the sealant compositions. When, however, the adhesive compositions of this invention are laid down and cured as an adhesive primer in the interior of such compartments, the sealant composition becomes strongly and reliably adhered thereto. It will be appreciated that the fluidity and low temperature curing properties of this invention lend themselves admirably to this particular art, which requires the application of the adhesive primer by slushing methods, and which admits of the application of only moderate degrees of curing heat. The solvent-, water- and cold-resistance of the adhesive bonds of this invention are ideally suited to aircraft service.

Whereas, as above noted, the adhesives of this invention may be used upon surfaces which have not been as scrupulously cleaned as would be necessary with other adhesives, it is to be understood that gross uncleanliness should not be present upon the surfaces to which the adhesives of this invention are to be applied. Likewise, improved and more consistent results will be obtained if elementary precautions are observed, for instance, solvent degreasing and, in the case of aluminum, anodizing or treatment with chromic acid.

Further with regard to the fuel sealant compositions which may be adhered to the interior or aircraft fuel cells by the adhesive compositions of this invention, these may be any compositions conventionally used for this purpose, such as the rubbery, moderately high molecular weight condensation products of dibasic acids, such as sebacic acid, azelaic acid, etc. with dihydric alcohols such as ethylene glycol. Most conveniently, these may be applied as a solvent dispersion on top of an adhesive primer coat of this invention, previously applied to and cured upon the interior of the aircraft fuel cell. In such cases, it will be desirable to incorporate a small amount of an organic peroxide, such as benzoyl peroxide, in the sealant composition, so that the sealant composition becomes insolubilized upon drying and moderate heating up to temperatures on the order of 40°–150° C.

The invention is illustrated in the accompanying drawing, which shows an adhesive primer in accordance with this invention used to adhere a fuel sealant composition to the interior of an integral fuel cell enclosure in an aluminum aircraft wing. The preparation of this construction is more particularly described in Example I to follow.

With the foregoing general discussion in mind, there is given herewith a detailed example of the practice of this invention. All parts given are by weight.

EXAMPLE I

*Adhesive composition*

A

Resorcinol, 68.5 parts (1 molecular equivalent)
Methyl ethyl ketone, methyl amyl ketone, or cyclohexanone, 180 parts

B

Formaldehyde solution (37% aqueous solution), 104 parts (2 molecular equivalents)
Potassium hydroxide, 0.5, 1.0 or 2.0 parts

C

Methyl ethyl ketone, 1360 parts

D

"Vinylite VYNW" (a copolymer of vinyl chloride with 15% of vinyl acetate, manufactured by the Carbide & Carbon Chemicals Corporation), 100 parts
"Gelva" 2.5 centipoise grade (a polymer of vinyl acetate, manufactured by the Shawinigan Products Corporation), 93 parts
Methyl isobutyl ketone, 1610 parts
Methyl ethyl ketone, 2400 parts

*Sealant*

Paraplex X-100 (a rubbery polyester manufactured by the Rohm & Haas Company), 100 parts
Vinylite VYNW, 50 parts
Aluminum trihydrate, 80 parts
Benzoyl peroxide, 5 parts
Methyl ethyl ketone, 475 parts
Methyl isobutyl ketone, 475 parts A series of cements were made up from materials as set forth under "Adhesive composition" using, in all possible combinations, the various ketones listed at "A" and the various proportions of potassium hydroxide indicated. In each case, the selected quantity of potassium hydroxide was dissolved in the formaldehyde, yielding a solution which will be designated "B." The resorcinol and selected ketone listed at "A" were made up into a solution and stirred into solution "B." The combined solution was then heated at 70° C. for 45 minutes, at the end of which time the solution was diluted and thereby simultaneously cooled to 25° C. by admixture with the methyl ethyl ketone "C." The diluted and cooled solution was then mixed with a cement made from the ingredients listed at "D." Each of the resultant combined cements was stored for a number of weeks without exhibiting any tendency to gel.

Each of the adhesive cements was tested as an adhesive primer for a fuel compartment sealant as follows. A rectangular closable can 4" x 6" x 10" was built up from .051 ga. anodized aluminum-clad Duralumin (24ST), the seams being merely riveted or bolted without any other provision for tightness. The interior surfaces of the can were slushed with the adhesive cement under test, dried and heated at 85° C. for one hour. The can was then cooled, the interior surfaces slushed with a cement made up from the ingredients listed under "Sealant," and dried.

One gallon of aviation fuel was then introduced into the can, which was then closed up and placed in a slosh tester which rocked the can at the end of a 6 foot radius with a total stroke of 30° and a frequency of 20 cycles per minute. All of the cans withstood this test for weeks without showing any appreciable loss of contents. Likewise, the cans were dented at the seams at a temperature of −40° C. without detriment to the adhesion of the sealant membrane.

EXAMPLE II

*Fuel cell application*

An aluminum-clad Duralumin aircraft wing section integral fuel cell was caulked externally by means of a temporary sealing composition. The cell was then sloshed with trichloroethylene to remove grease and other gross contamination. The cell was then dried out and completely filled with a 3% aqueous chromic acid solution at 93° C., and let stand at this temperature for 4 hours. The cell was then drained, thoroughly rinsed with water, and dried 30 minutes at 90° C.

The cell was then completely filled with the cement of this invention prepared as described in Example I from the ingredients listed under "Adhesive composition," and allowed to stand for a few minutes. The cement was then drained out, and the cell dried for 30 minutes at room temperature, followed by 45 minutes at 115° C., gentle circulation of air being maintained throughout. The cell was then completely filled with the composition made as described in Example I from the ingredients listed under "Sealant," let stand for a few minutes, drained, and dried at room temperature for 10 minutes, followed by 60 minutes at 35°–40° C., all with gentle circulation of air. Six additional coats of the same sealant were successively applied by the same method of filling and draining, and dried between coats for 10 minutes at room temperature followed by 20 minutes at 35°–40° C. Two final coats, substantially the same as the composition prepared in Example I from the ingredients under "Sealant" with the exception that the "Vinylite VYNW" was increased to 150 parts, were applied by the same method of filling and draining and with the same schedule of drying. The assembly was finally dried at 35° C. for 16 hours followed by 50° C. for one hour and finally 90° C. for 40 minutes, all with gentle circulation of air. The resultant sealed fuel cell compartment gave long and excellent service under very adverse conditions of vibration, cold and moisture.

EXAMPLE III

*Viscose spinning bucket*

A viscose spinning bucket forged from the Aluminum Company of America 52–S alloy (an aluminum alloy designed for forging) was coated by the process of this invention.

The bucket was first solvent degreased, etched 20 minutes in 15% aqueous chromic acid at 90° C., rinsed with water and dried at 120° C. for 20 minutes. The bucket was then immersed for two minutes in the adhesive primer prepared from the ingredients listed under "Adhesive composition" as described in Example I, drained and dried 30 minutes at room temperature followed by 30 minutes at 120° C. Thereafter there were applied two coats of the "Sealant" modified by increasing the "Vinylite VYNW" to 150 parts. The coats were applied by brushing, and the bucket dried between coats for 20 minutes at 35°–40° C. The finished bucket was finally dried according to the schedule: 2 hours at 40° C., 1 hour at 60° C. and 30 minutes at 95° C.

The coated bucket withstood service conditions of contact with dilute sulfuric acid coagulating bath and fiber abrasion for an extended period of time, far exceeding the lives of coatings heretofore tried out for this purpose.

The adhesive composition was also used to bond a variety of other materials as follows:

Tin plated steel
Low carbon steel
Brass
Magnesium
Stainless steel

Wood
Buna N
Buna S
Rubber
Cotton fabric

From the foregoing general discussion and detailed example, it will be evident that this invention provides novel and highly stable resorcinol-formaldehyde adhesive capable of establishing bonds with a wide variety of materials, and in particular, with a number of materials which are not amendable to ordinary adhesion procedures, such as aircraft metals on the order of aluminum, anodized aluminum-clad Duralumin, and stainless steel. The manufacture of the adhesives is readily carried out, and the resultant products have very favorable application properties, being single-solution materials containing no appreciable free formaldehyde or other disagreeable material; stable in storage; freely fluid for application; and curable by heating at only slightly elevated temperatures. The adhesive bonds produced are not deteriorated by solvents, moisture or mechanical distortion, even at low temperatures.

What is claimed is:

1. Process of making a staple, flowable resorcinol-formaldehyde adhesive cement, which comprises heating at temperatures from 50° C. to 90° C. 100 parts of a mixture containing 1 mol of resorcinol and approximately 2 mols of formaldehyde in the presence of from 150 to about 250 parts of a solvent selected from the group consisting of lower alkyl ketones containing from 4 to 12 carbon atoms and cyclohexanone and of an alkaline catalyst selected from the group consisting of potassium, sodium and lithium hydroxides and used in an amount molecularly equivalent to from 0.5 to 2.0 parts of potassium hydroxide, said catalyst having been introduced into the mixture in aqueous solution along with the formaldehyde, said aqueous solution containing from 20% to 37% of formaldehyde, continuing the heating until about 5 minutes before the time at which the mixture would gel, and cooling and diluting the reaction mass to yield a solution containing not more than about 15% of the condensation product of the resorcinol and formaldehyde.

2. Process of making a stable, flowable resorcinol-formaldehyde adhesive cement, which comprises heating at temperatures from 50° C. 90° C. 100 parts of a mixture containing substantially 1 mol of resorcinol and approximately 2 mols of formaldehyde in the presence of from 150 to about 250 parts of a solvent selected from the group consisting of lower alkyl ketones containing from 4 to 12 carbon atoms and cyclohexanone and of an alkaline catalyst selected from the group consisting of potassium, sodium and lithium hydroxides and used in an amount molecularly equivalent to from 0.5 to 2.0 parts of potassium hydroxide, said catalyst having been introduced into the mixture in aqueous solution along with the formaldehyde, said aqueous solution containing from 20% to 37% of formaldehyde, continuing the heating until about 5 minutes before the time at which the mixture would gel, cooling and diluting the reaction mass, and adding a solvent cement of (1) a resin selected from the group consisting of polymers of vinyl chloride and copolymers thereof with other unsaturated compounds copolymerizable therewith containing at least 85% of vinyl chloride copolymerized therein and (2) a resin selected from the group consisting of polymers of vinyl acetate and copolymers thereof with other unsaturated compounds copolymerizable therewith containing at least 85% of vinyl acetate copolymerized therein, the final concentration of the condensate of the resorcinol and formaldehyde being not greater than about 15%.

3. An adhesive cement comprising at least 1000 parts of a solvent having stably dispersed therein a partial condensation product of 100 parts of a mixture containing one mol of resorcinol and approximately 2 mols of formaldehyde, the condensation having been effected by heating at from 50° C. to 90° C. until about 5 minutes before the time at which the mixtures would gel in the presence of from 150 to about 250 parts of solvent selected from the group consisting of lower akyl ketones containing from 4 to 12 carbon atoms and cyclohexanone and of an alkaline catalyst selected from the group consisting of potassium, sodium and lithium hydroxides employed in amounts molecularly equivalent to from 0.5 part to 2.0 parts of potassium hydroxide and said alkaline catalysts having been introduced in aqueous solution along with the formaldehyde, said aqueous solution containing from 20% to 37% formaldehyde.

4. An adhesive cement comprising at least 1000 parts of solvent having stably dispersed therein (1) a resin selected from the group consisting of polymers of vinyl chloride and copolymers thereof with other unsaturated compounds copolymerizable therewith containing at least 85% of vinyl chloride copolymerized therein and (2) a resin selected from the group consisting of polymers of vinyl acetate and copolymers thereof with other unsaturated compounds copolymerizable therewith containing at least 85% of vinyl acetate copolymerized therein, and (3) a partial condensation product of 100 parts of a mixture containing one mol of resorcinol and approximately 2 mols of formaldehyde, the condensation having been effected by heating at from 50° C. to 90° C. until about 5 minutes before the time at which the mixtures would gel in the presence of from 150 to about 250 parts of solvent selected from the group consisting of lower alkyl ketones containing from 4 to 12 carbon atoms and cyclohexanone and of an alkaline catalyst selected from the group consisting of potassium, sodium and lithium hydroxides employed in amounts molecularly equivalent to from 0.5 parts to 2.0 parts of potassium hydroxide and said alkaline catalysts having been introduced in aqueous solution along with the formaldehyde, said aqueous solution containing from 20% to 37% formaldehyde.

5. An adhesive cement comprising at least 1000 parts of ketone solvent having stably dispersed therein (1) a resin selected from the group consisting of polymers of vinyl chloride and copolymers thereof with other unsaturated compounds copolymerizable therewith containing at least 85% of vinyl chloride copolymerized therein and (2) a resin selected from the group consisting of polymers of vinyl acetate and copolymers thereof with other unsaturated compounds copolymerizable therewith containing at least 85% of vinyl acetate copolymerized therein, and (3) a partial condensation product of 100 parts of a mixture containing one mol of resorcinol and approximately 2 mols of formaldehyde, the condensation having been effected by heating at from 50° C. to 90° C. until about 5 minutes before the time at which the mixtures would gel in the presence of from 150 to about 250 parts of ketone solvent selected from the group consisting of lower alkyl ketones containing from 4 to 12 carbon atoms and cyclohexanone and of an alkaline catalyst selected from the group consisting of potassium, sodium and lithium hydroxides employed in amounts molecularly equivalent to from 0.5 parts to 2.0 parts of potassium hydroxide and said alkaline catalysts having been introduced in aqueous solution along with the formaldehyde, said aqueous solution containing from 20% to 37% formaldehyde.

6. A solvent, moisture and cold resistant adhered structure comprising an anodized aluminum substrate, a rubbery linear polyester superstrate and an interposed cured adhesive bond comprising (1) a resin selected from the group consisting of polymers of vinyl chloride and copolymers thereof with other unsaturated compounds copolymerizable therewith containing at least 85% of vinyl chloride copolymerized therein and (2) a resin selected from the group consisting of polymers of vinyl acetate and copolymers thereof with other unsaturated compounds copolymerizable therewith containing at least 85% of vinyl acetate copolymerized therein, and (3) a partial condensation product of 100 parts of a mixture containing one mol of resorcinol and approximately 2 mols of formaldehyde, the initial stages of the condensation having been effected by heating at from 50° C. to 90° C. until about 5 minutes before the time at which the mixtures would gel in the presence of from 150 to about 250 parts of solvent selected from the group consisting of lower alkyl ketones containing from 4 to 12 carbon atoms and cyclohexanone and of an alkaline catalyst selected from the group consisting of potassium, sodium and lithium hydroxides employed in amounts molecularly equivalent to from 0.5 parts to 2.0 parts of potassium hydroxide and said alkaline catalysts having been introduced in aqueous solution along with the formaldehyde, said aqueous solution containing from 20% to 37% formaldehyde.

HARRY P. BRADLEY.

REFERENCES CITED

The following references are of record in the file of this patent:

UNITED STATES PATENTS

| Number | Name | Date |
| --- | --- | --- |
| 2,065,941 | Lane | Dec. 29, 1936 |
| 2,302,557 | Langkammerer | Nov. 17, 1942 |
| 2,398,388 | Norton | Apr. 16, 1946 |
| 2,437,284 | Watson | Mar. 9, 1948 |

FOREIGN PATENTS

| Number | Country | Date |
| --- | --- | --- |
| 120,874 | Austria | Jan. 26, 1931 |
| 550,693 | Great Britain | Jan. 20, 1943 |
| 120,810 | Australia | Jan. 24, 1946 |
| 912,470 | France | Apr. 29, 1946 |

Certificate of Correction

Patent No. 2,514,196 July 4, 1950

HARRY P. BRADLEY

It is hereby certified that error appears in the printed specification of the above numbered patent requiring correction as follows:

Column 1, line 3, for the words "other metals" read *other materials*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*